(12) United States Patent
Abe et al.

(10) Patent No.: US 11,118,558 B2
(45) Date of Patent: Sep. 14, 2021

(54) HYDROELECTRIC POWER GENERATION SYSTEM

(71) Applicant: DAIKIN INDUSTRIES, LTD., Osaka (JP)

(72) Inventors: Takahiro Abe, Osaka (JP); Atsushi Suhara, Osaka (JP); Tomomi Sakamoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/332,216

(22) PCT Filed: Sep. 14, 2017

(86) PCT No.: PCT/JP2017/033247
§ 371 (c)(1),
(2) Date: Mar. 11, 2019

(87) PCT Pub. No.: WO2018/056163
PCT Pub. Date: Mar. 29, 2018

(65) Prior Publication Data
US 2019/0271291 A1    Sep. 5, 2019

(30) Foreign Application Priority Data

Sep. 20, 2016   (JP) .............................. JP2016-182838

(51) Int. Cl.
*F03B 13/10*   (2006.01)
*F03B 15/02*   (2006.01)
(Continued)

(52) U.S. Cl.
CPC .............. *F03B 13/10* (2013.01); *F03B 15/02* (2013.01); *F03B 15/04* (2013.01); *H02J 9/00* (2013.01); *H02P 9/04* (2013.01); *Y02E 10/20* (2013.01)

(58) Field of Classification Search
CPC .......... F03B 15/02; F03B 15/03; F03B 13/10; H02P 9/04
(Continued)

(56) References Cited

U.S. PATENT DOCUMENTS 3,750,001 A * 7/1973 McCloskey ............ A01G 25/16
322/35
4,352,025 A * 9/1982 Troyen .................... F03B 13/00
290/54

(Continued)

FOREIGN PATENT DOCUMENTS

CN    2777228 Y    5/2006
JP    4868984 B2   2/2012
(Continued)

OTHER PUBLICATIONS

English Translation of JP 2016 119758 A (Year: 2016).*
International Search Report (PCT/ISA/210) issued in PCT/JP2017/033247, dated Dec. 19, 2017.

*Primary Examiner* — Sean Gugger
(74) *Attorney, Agent, or Firm* — Birch, Stewart, Kolasch & Birch, LLP

(57) ABSTRACT

A hydraulic power generation system is provided with a control unit which controls the power supply circuit to perform a normal operation of supplying power from the power system to a predetermined electric device provided at the water channel and an autonomous operation of supplying the power generated by the electric generator to the electric device. The control unit executes the autonomous operation when the power system fails.

13 Claims, 8 Drawing Sheets

(51) Int. Cl.
*H02P 9/04* (2006.01)
*H02J 9/00* (2006.01)
*F03B 15/04* (2006.01)

(58) Field of Classification Search
USPC .................................................. 290/43, 54
See application file for complete search history.

(56) References Cited

U.S. PATENT DOCUMENTS

| | | | | |
|---|---|---|---|---|
| 4,467,216 A * | 8/1984 | Murphy | ............. | F03B 15/08 290/40 R |
| 4,496,845 A * | 1/1985 | Ensign | ............. | F03B 15/12 290/43 |
| 4,754,156 A * | 6/1988 | Shiozaki | ............. | F03B 15/08 290/40 C |
| 4,791,309 A * | 12/1988 | Payne | ............. | F03B 15/06 290/40 A |
| 5,754,446 A * | 5/1998 | Fisher, Jr. | ............. | F03B 15/12 290/40 R |
| 7,632,040 B2 * | 12/2009 | Cripps | ............. | E02B 9/00 290/1 R |
| 7,768,146 B2 * | 8/2010 | Balzano | ............. | F03B 13/00 290/43 |
| 8,400,007 B2 * | 3/2013 | Campbell | ............. | F03B 13/06 290/54 |
| 9,869,292 B2 * | 1/2018 | Kang | ............. | F03B 15/16 |
| 2007/0041790 A1 * | 2/2007 | Cripps | ............. | E03F 3/00 405/75 |
| 2011/0006530 A1 * | 1/2011 | Van Blerk | ............. | E02B 9/00 290/52 |
| 2013/0088015 A1 * | 4/2013 | Walton | ............. | F03B 1/00 290/54 |
| 2014/0265328 A1 * | 9/2014 | Van Blerk | ............. | F03B 11/004 290/43 |
| 2015/0102603 A1 * | 4/2015 | Schaefer | ............. | F03B 15/04 290/52 |
| 2017/0314527 A1 * | 11/2017 | Sakamoto | ............. | F03B 15/04 |
| 2018/0266383 A1 * | 9/2018 | Barg | ............. | F03B 3/06 |
| 2018/0375452 A1 * | 12/2018 | Yoshida | ............. | H02P 23/0027 |
| 2019/0331086 A1 * | 10/2019 | Abe | ............. | H02P 9/04 |
| 2020/0080538 A1 * | 3/2020 | Hector, Jr. | ............. | F03B 13/266 |

FOREIGN PATENT DOCUMENTS

| | | |
|---|---|---|
| JP | 2014-214710 A | 11/2014 |
| JP | 2015-226426 A | 12/2015 |
| JP | 2016-84814 A | 5/2016 |
| JP | 2016-119758 A | 6/2016 |

* cited by examiner

HYDROELECTRIC POWER GENERATION SYSTEM

TECHNICAL FIELD

The present invention relates to a hydraulic power generation system.

BACKGROUND ART

There has been a hydraulic power generation system that generates electric power by a fluid (e.g., water) flowing through a water channel (a penstock). For example, Patent Document 1 discloses a hydraulic power generation system, in which a water turbine (a fluid machine) is connected to a penstock. When the water turbine is driven to rotate by a fluid, a generator connected to the water turbine is driven. Power output by the generator is supplied to a power system by, for example, a reverse power flow.

CITATION LIST

Patent Document

Patent Document 1: Japanese Unexamined Patent Publication No. 2014-214710

SUMMARY OF THE INVENTION

Technical Problem

In some cases, an electric device such as a motor-operated valve or a flowmeter is provided in a water channel of a hydraulic power generation system. The electrical device provided at the water channel is important for supplying a fluid at a desired flow rate to the supply destination. It is therefore conceivable to introduce an uninterruptible power supply (UPS) as a measure against a power failure of a power system for supplying electric power to electric equipment. However, this measure may lead to a complicated structure of the apparatus and increase in cost of the apparatus.

It is therefore an object of the present invention to provide a hydraulic power generation system in which an uninterruptible power supply connected to electric equipment provided at a water channel can be omitted or downsized.

Solution to the Problem

A first aspect is directed to a hydraulic power generation system which includes: a fluid machine (W) connected to a water channel (1) through which a fluid flows; a generator (G) driven by the fluid machine (W); a power supply circuit (C) which supplies power generated by the generator (G) to a power system (5); and a control unit (20) which controls the power supply circuit (C) to perform a normal operation of supplying power from the power system (5) to a predetermined electric device (15, 16, 17, 18) provided at the water channel (1) and an autonomous operation of supplying the power generated by the electric generator (G) to the electric device (15, 16, 17, 18). The control unit (20) executes the autonomous operation when the power system (5) fails.

In this configuration, the generator (G) is driven by the fluid machine (W) operated by a fluid. The power generated by the generator (G) (output power) is supplied to the power system (5) via the power supply circuit (C) (reverse power flow).

The control unit (20) controls the power supply circuit (C) so that a normal operation is performed when the power system (5) is in a normal state, and an autonomous operation is performed when the power system (5) fails. In the normal operation, power is supplied from the power system (5) to a predetermined electric device (15, 16, 17, 18) provided at the water channel (1).

In the autonomous operation, the power generated by the generator (G) is directly supplied to the electric device (15, 16, 17, 18) via the power supply circuit (C). It is thus possible to continuously operate the electric device (15, 16, 17, 18) provided at the water channel (1) even when the power system (5) fails.

A second aspect is an embodiment of the first aspect. In the second aspect, the control unit (20) reduces an output power of the generator (G) in the autonomous operation.

In this configuration, the control unit (20) reduces the output power of the generator (G) in the autonomous operation. It is thus possible to avoid the output power of the generator (G) from being excessively large when the power system (5) fails.

A third aspect is an embodiment of the second aspect. In the second aspect, the control unit (20) controls the generator (G) so that the output power of the generator (G) decreases in the autonomous operation.

In this configuration, the generator (G) is controlled so that the output power of the generator (G) decreases in the autonomous operation. Responsiveness of the control of the generator (G) is relatively high, which makes it possible to quickly reduce the output power of the generator (G) and to quickly avoid the output power of the generator (G) from becoming excessively large.

A fourth aspect is an embodiment of the second aspect. In the fourth aspect, a motor-operated valve (15) is connected to the water channel (1) as the electric device, and the control unit (20) reduces an opening degree of the motor-operated valve (15) in the autonomous operation so that the output power of the generator (G) decreases.

In this configuration, the opening degree of the motor-operated valve (15) is reduced in the autonomous operation. As a result, an effective head (H) of the fluid machine (W), i.e., a physical quantity of the fluid, decreases, and thus, the output power of the generator (G) decreases. The decrease in the output power of the generator (G) makes it possible to reliably avoid, for example, a case in which an operating point of the fluid machine (W) reaches a cavitation region (an operating state in which the fluid evaporates and fine air bubbles are generated). Moreover, with the power output from the generator (G) supplied to the motor-operated valve (15), the opening degree of the motor-operated valve (15) can be reliably reduced even when the power system (5) fails.

A fifth aspect is an embodiment of the second aspect. In the fifth aspect, a motor-operated valve (15) is connected to the water channel (1) as the electric device, and the control unit (20) controls the generator (G) and an opening degree of the motor-operated valve (15) so that the output power of the generator (G) decreases in the autonomous operation.

In this configuration, the output power of the generator (G) is reduced by controlling the generator (G) and the opening degree of the motor-operated valve (15). If the output power of the generator (G) is reduced only by the control of the generator (G) without the control of the motor-operated valve (15), the operating point of the fluid machine (W) may possibly reach the cavitation region. On the other hand, if the output power of the generator (G) is reduced only by the control of the motor-operated valve (15) without the control of the generator (G), the output power of the generator (G) may possibly be temporarily excessive when the power system (5) fails. This is because the opening degree of the motor-operated valve (15) is mechanically adjusted and therefore the responsiveness of the motor-operated valve (15) is generally lower than that of the generator (G).

On the other hand, in the autonomous operation according to the present aspect of the invention, both of the generator (G) and the motor-operated valve (15) are controlled. This can quickly avoid an excessive increase in the output power of the generator (G) through the control of the generator (G), the responsiveness of which control is relatively high, and can reliably avoid the occurrence of cavitation through the control of the motor-operated valve (15), the responsiveness of which control is relatively low.

A sixth aspect is an embodiment of any one of the second to fifth aspects. In the sixth aspect, a motor-operated valve (16) is connected to the water channel (1) as the electric device, the hydraulic power generation system further includes a flow rate acquisition unit (17, 18) which acquires a flow rate of the fluid in the water channel (1), and the control unit (20) controls an opening degree of the motor-operated valve (16) in accordance with the flow rate acquired by the flow rate acquisition unit (17, 18) when the power system (5) fails.

In this configuration, the output power of the generator (G) is supplied to the motor-operated valve (16) when the power system (5) fails and the autonomous operation is performed. The control unit (20) controls the motor-operated valve (16) in accordance with the flow rate acquired by the flow rate acquisition unit (17, 18). Thus, the fluid can be supplied to the downstream side of the water channel (1) at a desired flow rate even after the power system (5) has failed.

A seventh aspect is an embodiment of the sixth aspect. In the seventh aspect, the water channel (1) has a bypass channel (13) which bypasses the fluid machine (W) and to which the motor-operated valve (16) is connected, and the control unit (20) controls an opening degree of the motor-operated valve (16) so that a total flow rate of the fluid flowing out of the water channel (1) approaches a target flow rate when the power system (5) fails.

In this configuration, a bypass channel (13) is provided at the water channel (1) to bypass the fluid machine (W). After the power failure of the power system (5), the opening degree of the motor-operated valve (16) is controlled so that the total flow rate of the fluid flowing out of the water channel (1) approaches a target flow rate. As a result, even if the flow rate of the fluid flowing through the fluid machine (W) decreases due to the reduction in the output power of the generator (G), the flow rate of the fluid in the bypass channel (13) can be increased to keep the target flow rate.

An eighth aspect is an embodiment of any one of the first to seventh aspects. In the eighth aspect, a resistor (40) which consumes the power generated by the generator (G) when the power system (5) fails is connected to the power supply circuit (C).

In this configuration, the resistor (40) can consume the surplus power even if the power generated by the generator (G) becomes excessive when the power system (5) fails and the autonomous operation is performed. The resistance capacity of the resistor (40) becomes relatively small because the power generated by the generator (G) is consumed by the electric device (15, 16, 17, 18) provided at the water channel (1).

Advantages of the Invention

According to the first aspect, the autonomous operation is performed when the power system (5) fails. In the autonomous operation, the power generated by the generator (G) is directly supplied to the electric device (15, 16, 17, 18). This configuration allows the power to be stably supplied to the electric device (15, 16, 17, 18), while omitting or downsizing an uninterruptible power supply. The cost of the hydraulic power generation system can thus be reduced.

According to the second aspect, the output power of the generator (G) can be avoided from being excessively large when the power system (5) fails, which makes it possible to reduce, for example, the capacity of the resistor (regenerative resistor) for consuming the generated power.

According to the third aspect, the generator (G) is controlled in the autonomous operation, which makes it possible to quickly reduce the power generated by the generator (G).

According to the fourth aspect, the opening degree of the motor-operated valve (15) is reduced in the autonomous operation, which makes it possible to reliably reduce the output power of the generator (G) while avoiding the operating point of the fluid machine (W) from reaching the cavitation region. The opening degree of the motor-operated valve (15) can be reduced without the uninterruptible power supply.

According to the fifth aspect, both of the generator (G) and the motor-operated valve (15) are controlled in the autonomous operation, which makes it possible to quickly reduce the output power of the generator (G) while avoiding the operating point of the fluid machine (W) from reaching the cavitation region.

According to the sixth aspect, the fluid can be supplied to the downstream side of the water channel (1) at a desired flow rate even after the power system (5) has failed. In particular, according to the seventh aspect, even when the flow rate of the fluid flowing through the fluid machine (W) changes, the total flow rate can be maintained at the target flow rate by the adjustment of the opening degree of the motor-operated valve (16) provided at the bypass channel (13).

According to the eighth aspect, overvoltage in the power supply circuit (C) can be reliably avoided. Moreover, with relatively small resistance capacity, the resistor (40) can be downsized.

DESCRIPTION OF EMBODIMENTS

Embodiments of the present invention will be described in detail below with reference to the drawings. The embodiments described below are merely exemplary ones in nature, and are not intended to limit the scope, applications, or use of the invention.

First Embodiment

Figure 1:
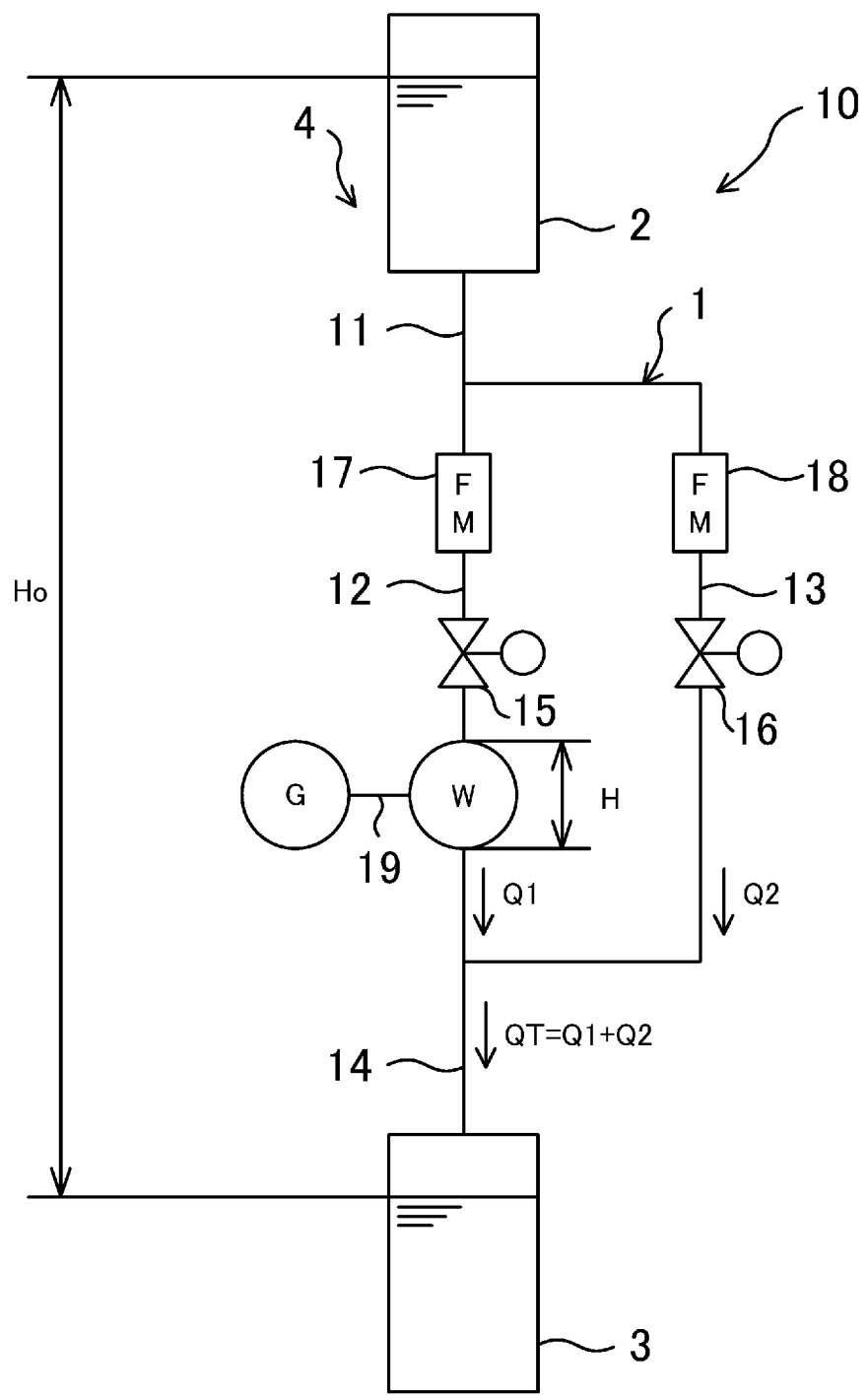
FIG. 1 is a diagram illustrating an overall schematic configuration of a hydraulic power generation system of a first embodiment including a penstock system.

FIG. 1 is a diagram illustrating an overall schematic configuration of a penstock (1) including a hydraulic power generation system (10) of a first embodiment of the present invention. Head of the penstock (1) allows a fluid to flow, and the penstock (1) is an example of a water channel of the present invention. In the present embodiment, the penstock is part of a waterworks (4). The waterworks (4) is provided with a storage tank (2) and a water receiving tank (3). The penstock (1) of the present embodiment is disposed in the middle of a pipe route connecting the storage tank (2) and the water receiving tank (3) provided downstream of the storage tank (2).

<Hydraulic Power Generation System (10)>

Figure 2:
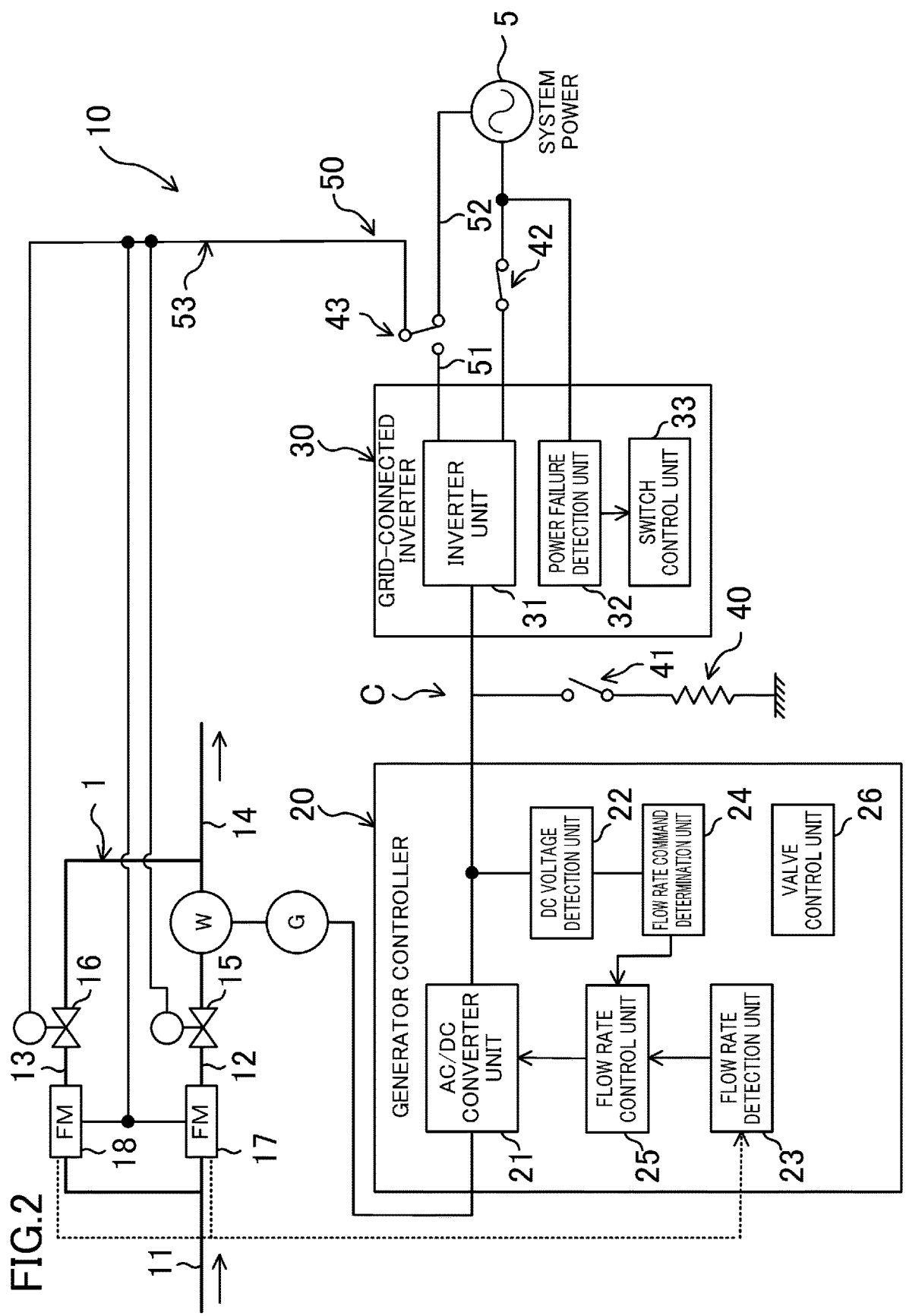
FIG. 2 is a diagram illustrating a power system of the hydraulic power generation system, and illustrates a state of a normal operation.

As illustrated in FIG. 1, the hydraulic power generation system (10) has a water turbine (W) and a generator (G). FIG. 2 is a diagram illustrating a power system of the hydraulic power generation system (10). The hydraulic power generation system (10) has a generator controller (20), a grid-connected inverter (30), and a regenerative resistor (40). Power generated in the hydraulic power generation system (10) is supplied to the power system (5). In this example, the power system (5) is a so-called commercial power supply, and the hydraulic power generation system (10) performs a so-called electric power selling by supplying power to the power system (5) (so-called reverse power flow). An electric circuit from the generator (G) to the power system (5) constitutes a power supply circuit (C).

—Water Turbine (W)—

The water turbine (W) is disposed in the middle of the penstock (1), and is an example of a hydraulic machine of the present invention. In this example, the water turbine (W) includes an impeller and a casing (none of which is shown). An impeller provided for a volute pump is used as the impeller of the water turbine (W). A rotation shaft (19) is fixed at a center portion of the impeller. The water turbine (W) is configured such that the impeller is rotated under pressure caused by a water flow from a fluid inlet (not shown) formed in the casing and thereby rotates the rotation shaft (19). Note that the fluid that has flowed into the water turbine (W) is discharged from a fluid outlet (not shown) formed in the casing.

—Generator (G)—

The generator (G) is connected to, and is driven to rotate by, the rotation shaft (19) of the water turbine (W), and generates power. In this example, the generator (G) has a permanent magnet embedded rotor and a stator with a coil (none of which is shown).

—Piping System—

An inflow pipe (11), an outflow pipe (14), a first branch pipe (12), and a second branch pipe (13) are connected to the penstock (1) (piping system) of the hydraulic power generation system (10). The penstock (1) of the present embodiment consists of a metal pipe (e.g., a ductile cast iron pipe). The storage tank (2) is connected to an inflow end of the inflow pipe (11). The water receiving tank (3) is connected to an outflow end of the outflow pipe (14). The first branch pipe (12) and the second branch pipe (13) are connected in parallel with each other between the inflow pipe (11) and the outflow pipe (14). The first branch pipe (12) constitutes a flow passage on the water turbine side, in which water for driving the water turbine (W) flows. The second branch pipe (13) constitutes a bypass channel for bypassing the water turbine (W).

A first flowmeter (17), a first motor-operated valve (15), and the water turbine (W) are connected to the first branch pipe (12) sequentially from the upstream to the downstream. A second flowmeter (18) and a second motor-operated valve (16) are connected to the second branch pipe (13) sequentially from the upstream to the downstream.

The first flowmeter (17) and the second flowmeter (18) are configured to be operated by electricity. The first flowmeter (17) detects the flow rate of water flowing through the water turbine (W), and outputs a detection signal. The second flowmeter (18) detects the flow rate of water flowing through the second branch pipe (13), and outputs a detection signal. In other words, the first flowmeter (17) and the second flowmeter (18) constitute a flow rate acquisition unit for acquiring the flow rate of the fluid in the penstock (1). The first flowmeter (17) and the second flowmeter (18) of the present embodiment constitute electric equipment driven by electricity, for example.

The first motor-operated valve (15) and the second motor-operated valve (16) respectively have valve bodies, which are driven by an electric motor to control a physical quantity (e.g., a flow rate, a pressure, an effective head) of the fluid. The first motor-operated valve (15) is closed for maintenance of the water turbine (W), for example, and inhibits the water from passing through the water turbine (W) in a suspended state. The first motor-operated valve (15) opens at a predetermined opening degree (for example, a fixed value) while the hydraulic power generation system (10) is operating. The second motor-operated valve (16) controls a physical quantity (e.g., a flow rate, a pressure, and an effective head) of the fluid flowing through the second branch pipe (13).

Note that the sum of the detected value of the first flowmeter (17) and the detected value of the second flowmeter (18) is the total flow rate (QT) of the fluid flowing out of the penstock (1).

—Generator Controller (20)—

The generator controller (20) includes an AC/DC converter unit (21), a DC voltage detection unit (22), a flow rate detection unit (23), a flow rate command determination unit (24), a flow rate control unit (25), and a valve control unit (26). The generator controller (20), together with the grid-connected inverter (30), controls the power supplied to the power system (5) while maintaining the physical quantity of the fluid (in this case, the total flow rate (QT) of the penstock (1)) at a desired value.

The AC/DC converter unit (21) includes a plurality of switching elements, and switches the power (AC power) generated by the generator (G) to convert the AC power into DC power. The output of the AC/DC converter unit (21) is smoothed by a smoothing capacitor (not shown), and is output to the grid-connected inverter (30).

The DC voltage detection unit (22) detects an output voltage of the AC/DC converter unit (21). A detected value (DC voltage (Vdc)) by the DC voltage detection unit (22) is transmitted to the flow rate command determination unit (24). The flow rate detection unit (23) reads the detection values of the first flowmeter (17) and the second flowmeter (18), and transmits the detected values to the flow rate control unit (25) periodically or in response to a request of the flow rate control unit (25).

The flow rate command determination unit (24) includes a microcomputer and a memory device in which a program for operating the microcomputer is stored. The flow rate command determination unit (24) determines a flow rate command value (Q1*), which is a target value of the flow rate (Q1) of the water turbine (W), from a target value of the power and a target total flow rate (QT*) which is a target value of the total flow rate (QT). In general, the target value of the power is usually, for example, a rated output, which will be described later, but the target value is changed in accordance with the detected value of the DC voltage detection unit (22), as will be described later in detail. For example, a function or a characteristic map (M) described later, which is defined in the program in advance, may be used to generate the flow rate command value (Q1*).

The flow rate control unit (25) includes a microcomputer and a memory device in which a program for operating the microcomputer is stored. The microcomputer and the memory device may be shared with the flow rate command determination unit (24), or may be provided independently. The flow rate control unit (25) controls the power generated by the generator (G) by controlling switching in the AC/DC converter unit (21). Specifically, the flow rate control unit (25) controls the power generated (the voltage output) by the generator (G) by feedback control in accordance with a difference between the flow rate command value (Q1*) and the current flow rate (Q1).

Further, the flow rate control unit (25) also controls the total flow rate (QT) in the penstock (1). In this example, the flow rate control unit (25) controls the opening degree of the second motor-operated valve (16) so that the fluid flows into the second branch pipe (13) at a flow rate corresponding to a difference between a target value of the total flow rate (QT) of the penstock (1) (hereinafter, referred to as a "target total flow rate (QT*)") and the current flow rate (Q1).

In an autonomous operation, which will be described later in detail, the valve control unit (26) performs control to reduce the opening degree of the first motor-operated valve (15).

The generator controller (20) is configured to be operable even when the power system (5) is in a power failure state.

—Grid-Connected Inverter (30)—

The grid-connected inverter (30) includes an inverter unit (31), a power failure detection unit (32), and a switch control unit (33).

The inverter unit (31) includes a plurality of switching elements, receives DC power from the generator controller (20), and converts the DC power into AC power by switching the DC power. The AC power generated by the inverter unit (31) is supplied to the power system (5) (reverse power flow). Further, the AC power generated by the inverter unit (31) can also be supplied to an auxiliary circuit (50). Note that the inverter unit (31) controls the switching so as to control the power which reversely flows into the power system (5).

The power failure detection unit (32) detects whether the power system (5) is in a power failure state or not by measuring a voltage value between the inverter unit (31) and the power system (5).

In accordance with the state (normal state or power failure state) of the power system (5) detected by the power failure detection unit (32), the switch control unit (33) switches the state of three switch units (41, 42, 43) which will be described later in detail.

The grid-connected inverter (30) is configured to be operable even when the power system (5) is in a power failure state.

—Regenerative Resistor (40)—

The regenerative resistor (40) is connected between the generator controller (20) (strictly speaking, the AC/DC converter unit (21)) and the grid-connected inverter (30) in the power supply circuit (C). The regenerative resistor (40) serves as a resistor which consumes surplus power generated by the generator (G). Specifically, the regenerative resistor (40) consumes part of the output power of the generator (G) when the power system (5) is in a power failure state.

—Auxiliary Circuit (50)—

The auxiliary circuit (50) is connected to the power supply circuit (C) and the power system (5). The auxiliary circuit (50) has a first circuit (generator-side circuit) (51) connected to the inverter unit (31), a second circuit (system power-side circuit) (52) connected to the power system (5), and a third circuit (auxiliary power supply circuit) (53) connectable to the first circuit (51) and the second circuit (52). An output side of the third circuit (53) branches into a plurality of branches, which are connected to electric devices connected to the penstock (1). Specifically, the third circuit (53) is connected to the first motor-operated valve (15), the second motor-operated valve (16), the first flowmeter (17), and the second flowmeter (18).

—First Switch Unit (41), Second Switch Unit (42), and Third Switch Unit (43)—

A first switch unit (41) and a second switch unit (42) are connected to the power supply circuit (C). The first switch unit (41) turns on/off the contact between the path between the AC/DC converter unit (21) and the generator controller (20) and the regenerative resistor (40). The second switch unit (42) is connected between the inverter unit (31) and the power system (5), and turns on/off the contact between them.

The auxiliary circuit (50) is connected to the third switch unit (43). The third switch unit (43) is connected between the first circuit (51), the second circuit (52), and the third circuit (53). The third switch unit (43) switches between a state in which the second circuit (52) and the third circuit (53) are connected together (first state), and a state in which the first circuit (51) and the third circuit (53) are connected together (second state).

The switch control unit (33) is configured to switch the states of the first switch unit (41), the second switch unit (42), and the third switch unit (43) in accordance with a signal from the power system (5). When the power system (5) is in a normal state, the switch control unit (33) sets the first switch unit (41) to an OFF state, the second switch unit (42) to an ON state, and the third switch unit (43) to the first state. When the power system (5) is in a power failure state, the switch control unit (33) sets the second switch unit (42) to an OFF state, and the third switch unit (43) to the second state. In addition, when the power system (5) is in a power failure state, the switch control unit (33) repeats the ON/OFF switching of the first switch unit (41) at a predetermined duty ratio.

These switch units (41, 42, 43) are configured to be operable even when the power system (5) is in a power failure state.

<Operation of Hydraulic Power Generation System>

The operation of the hydraulic power generation system (10) will be described with reference to FIGS. 1 to 6. The hydraulic power generation system (10) performs the normal operation and the autonomous operation in accordance with the state of the power system (5).

The normal operation is performed when the power system (5) is in a normal state. In the normal operation, the generator (G) is controlled to output a rated output. Power generated by the generator (G) is supplied to the power system (5). In this context, the rated output is the maximum output power of the generator (G) that can be exhibited by the hydraulic power generation system (10).

The autonomous operation is performed when the power system (5) is in a power failure state. In the autonomous operation, the output power of the generator (G) is reduced to a predetermined value lower than the rated output. The power generated by the generator (G) is supplied to each of the electric devices (15, 16, 17, 18) provided at the penstock (1) via the auxiliary circuit (50). The output power of the generator (G) in the autonomous operation is determined based on the power consumption of the electric devices (15, 16, 17, 18) provided at the penstock (1) (details will be described later).

—Relationship Among Parameters—

Before describing the details of each operation, the relationship among operating parameters of the hydraulic power generation system (10) will be described in detail with reference to the graph of FIG. 3. In the graph (also referred to as a characteristic map (M)) of FIG. 3, a vertical axis represents an effective head (H) of the penstock (1), and a horizontal axis represents a flow rate (i.e., a total flow rate (QT)) of the fluid flowing out of the penstock (1). The effective head (H) is obtained by subtracting, from the total head (Ho) from the fluid level of the storage tank (2) to the fluid level of the water receiving tank (3), a head corresponding to resistances offered by the penstock (1) while water in the storage tank (2) flows through the penstock (1) and reaches the water receiving tank (3).

Figure 3:
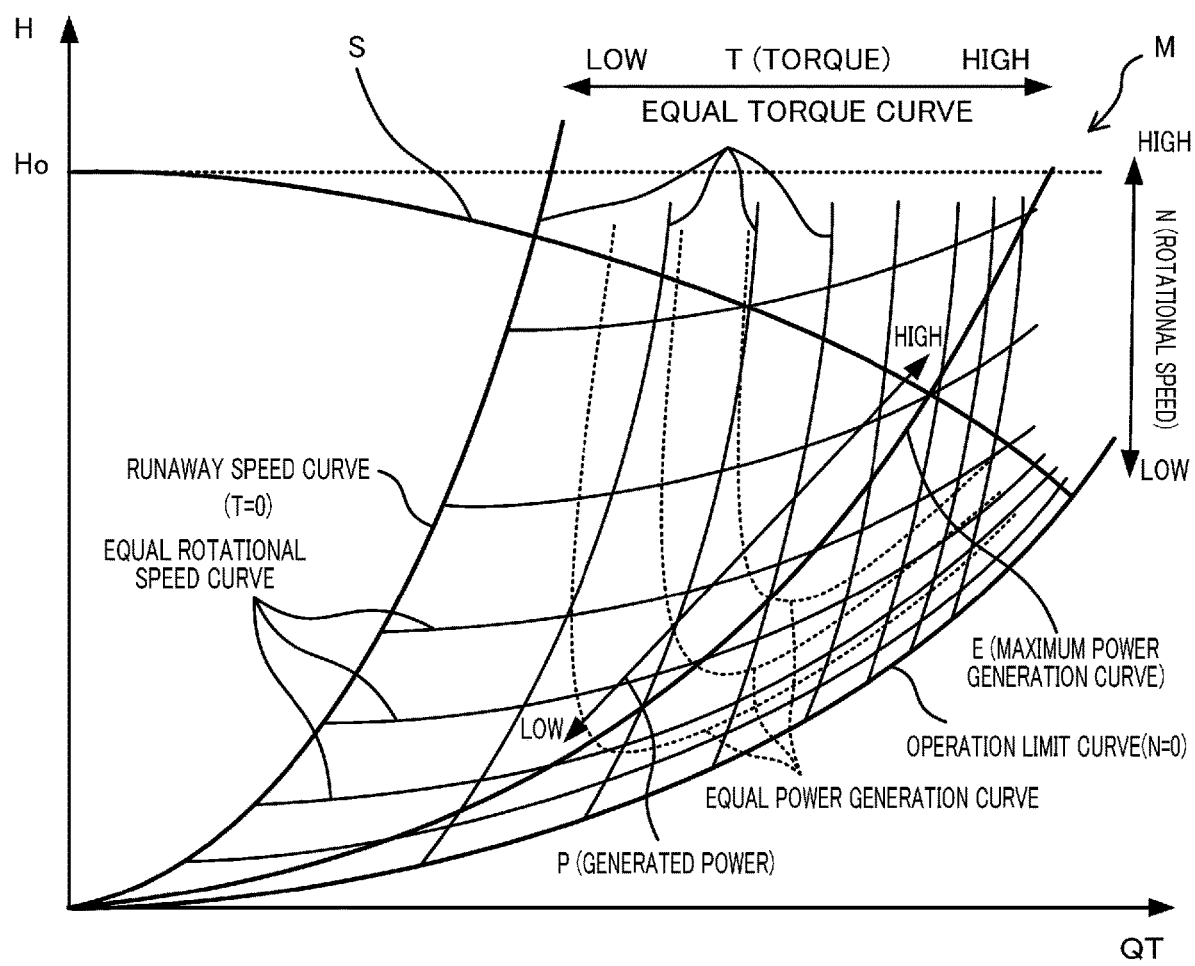
FIG. 3 is a graph showing a characteristic map of a hydraulic power generation system.

The relationship between the effective head (H) and the total flow rate (QT) can be expressed by a flow resistance characteristic line (also referred to as a "system loss curve (S)") shown in FIG. 3. In the system loss curve (S), the effective head (H) at the time when the total flow rate (QT) is equal to zero, i.e., (QT)=0, is the total head (Ho), and the effective head (H) decreases quadratically in accordance with the increase of the total flow rate (QT). The curvature of the system loss curve (S) has values unique to the penstock (1) of FIG. 1.

The total flow rate (QT) in the penstock (1) including the hydraulic power generation system (10) and the effective head (H) in this example correspond to a point on the system loss curve (S). For example, in a condition in which the second motor-operated valve (16) is fully closed and water is supplied only to the water turbine (W), the flow rate (Q1) in the water turbine (W) is the total flow rate (QT) of the penstock (1) including the hydraulic power generation system (10), and the point corresponding to the flow rate (Q1) in the water turbine (W) and the effective head (H) at that time is on the system loss curve (S). In other words, the operating point of the water turbine (W) at the time when the second motor-operated valve (16) is fully closed is on the system loss curve (S).

Further, if a fluid (water) is supplied to both of the water turbine (W) and the second branch pipe (13), the total value of the flow rate (Q1) in the water turbine (W) and the flow rate (Q2) in the second branch pipe (13) is the total flow rate (QT) of the penstock (1) including the hydraulic power generation system (10), and the total flow rate (QT) and the effective head (H) at that time correspond to a point on the system loss curve (S).

The characteristic map (M) of FIG. 3 represents a torque value (T) of the generator (G), a rotational speed (the number of rotations) (N) of the generator (G), and power (P) generated by the generator (G), as characteristics which correlate with the flow rate (Q1) in the water turbine (W) and the effective head (H).

The characteristic map (M) includes a region (which will be referred to as a water turbine region or an operable region) in which the water turbine (W) can be rotated by the water flow is formed. This region lies between a curve on which the torque value (T) of the generator (G) is zero (a runaway speed curve (T=0)) and a curve on which the rotational speed (N) of the generator (G) is zero (an operation limit curve (N=0)). The region on the left side of the runaway speed curve is a water turbine brake region (power running region).

In the water turbine region, a plurality of equal torque curves follow the runaway speed curve (T=0), and the torque value (T) also increases as the flow rate (Q1) increases on the map. Also, a plurality of equal rotational speed curves follow the operation limit curve (N=0), and the number of rotations increases as the effective head (H) increases. Furthermore, a plurality of equal power generation curves shown by the broken line are downward convex curves, and the generated power (P) increases as the effective head (H) and the flow rate (Q1) increase. A curve (E) connecting the apexes of the plurality of equal power generation curves is a maximum power generation curve (E) on which the generator (G) generates the maximum power.

The above-described relationship among the parameters on the characteristic map (M) can be stored in the memory device in the form of a table (number table) or a mathematical expression (function) in a program. That is, the parameters which can be represented on the characteristic map (M) can be used to obtain other parameters.

—Normal Operation—

In the normal operation of the hydraulic power generation system (10), the first switch unit (41) is in the OFF state, the second switch unit (42) is in the ON state, and the third switch unit (43) is in the first state, as shown in FIG. 2. That is, in the normal operation, the power generated by the generator (G) is supplied to the power system (5) via the AC/DC converter unit (21) and the inverter unit (31). In the normal operation, the power of the power system (5) is supplied to the first motor-operated valve (15), the second motor-operated valve (16), the first flowmeter (17), and the second flowmeter (18) via the auxiliary circuit (50). In the normal operation, the regenerative resistor (40) does not function.

In the normal operation, the first motor-operated valve (15) is open at a predetermined fixed opening degree. Then, the flow rate control unit (25) controls the opening degree of the second motor-operated valve (16) so that the total flow rate (QT) of the penstock (1) be the target total flow rate (QT*), while controlling the switching in the AC/DC converter unit (21), so that the power generated by the generator (G) be a target value (a rated output).

Specifically, in the present embodiment, in a condition in which the opening degree of the first motor-operated valve

(15) is set to a fixed value, the flow rate control unit (25) controls the switching of the AC/DC converter unit (21) so that the flow rate (Q1) in the water turbine (W) be the flow rate command value (Q1*) by means of, for example, feedback control, thereby converging the output of the generator (G) to the target generated power.

When there is a difference between the target total flow rate (QT*) and the current total flow rate (QT) in this power generation state, the flow rate control unit (25) adjusts the opening degree of the second motor-operated valve (16). The flow rate control unit (25) adjusts the opening degree of the second motor-operated valve (16) while comparing the detected value of the second flowmeter (18) transmitted from the flow rate detection unit (23) with a target value of the flow rate (Q2) (a difference between the target total flow rate (QT*) and the flow rate (Q1)). For example, feedback control can be used to adjust the opening degree. Note that there is no limitation on the setting of the target total flow rate (QT*). As an example, the target total flow rate (QT*) can be set to a total flow rate required by an administrator of the waterworks (4). The target total flow rate (QT*) may be a fixed value or may be variable according to time of day, for example.

Figure 4:
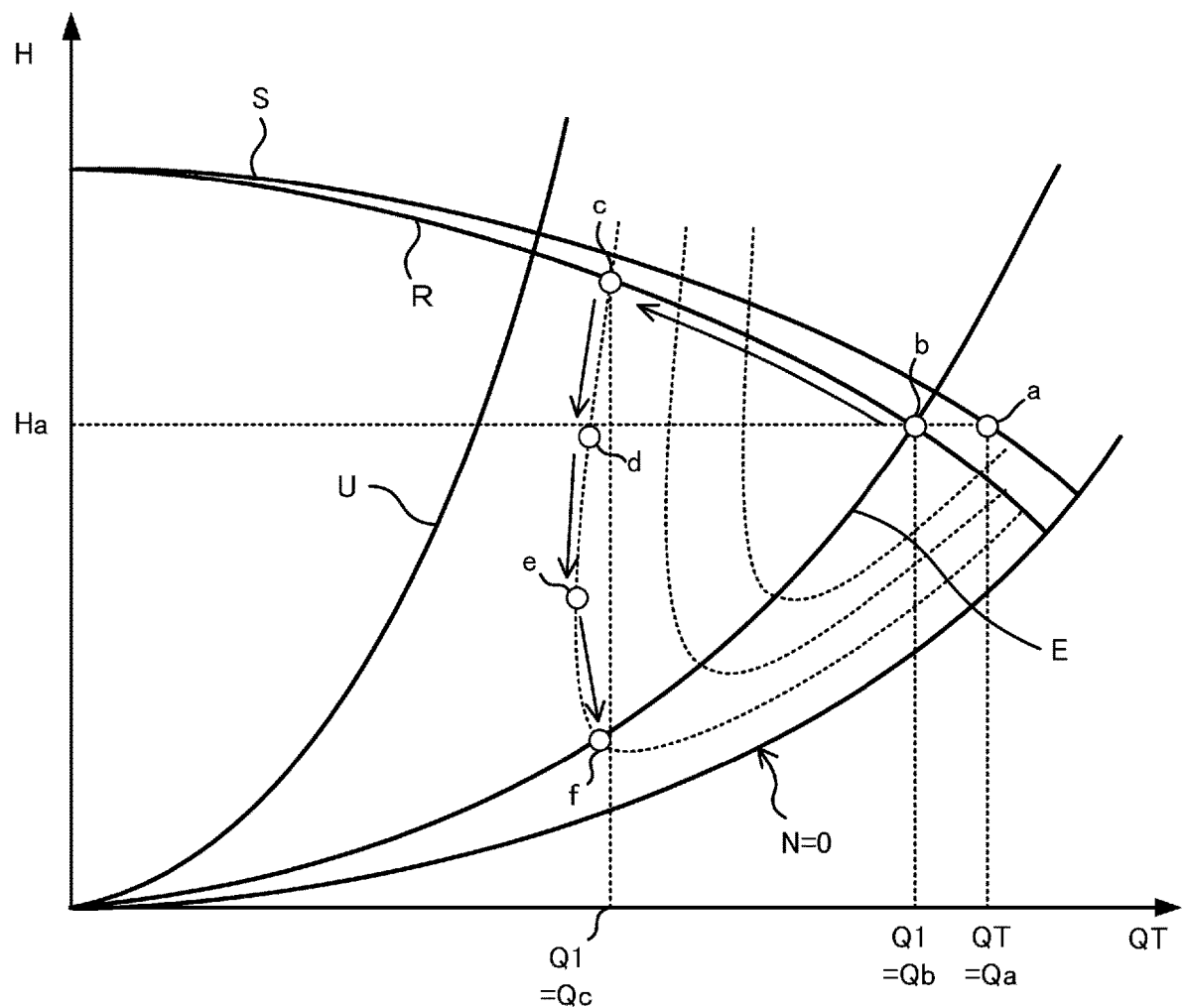
FIG. 4 shows changes in operating point of a normal operation and an autonomous operation on the characteristic map of the hydraulic power generation system.

The above-described flow rate command value (Q1*) for the flow rate (Q1) in the water turbine (W) can be determined, for example, as follows. In the example of FIG. 4, the target total flow rate (QT*) of the total flow rate (QT) in the penstock (1) is set to be a flow rate (Qa). The flow rate command value (Q1*) for the water turbine (W) can be obtained from the characteristic map (M) including the relationship between the system loss curve (S) of the penstock (1) and the generated power (P), or the relational expression corresponding to the characteristic map (M). Specifically, an effective head (Ha) for the water turbine (W) can be obtained from the flow rate (Qa) which is, for example, the target total flow rate (QT*), and the system loss curve (S) unique to the penstock (1) obtained in advance. A point of intersection of the effective head (Ha) for the water turbine (W) and the maximum power generation curve (E) is an operating point b of the water turbine (W) for obtaining the rated output of the generator (G). That is, the flow rate (Q1=Qb) in the water turbine (W) which corresponds to the operating point b is the flow rate command value (Q1*) of the water turbine (W) for obtaining the rated output.

—Autonomous Operation—

Next, the autonomous operation performed when the power system (5) is in a power failure state will be described with reference to FIGS. 4 to 6.

Figure 5:
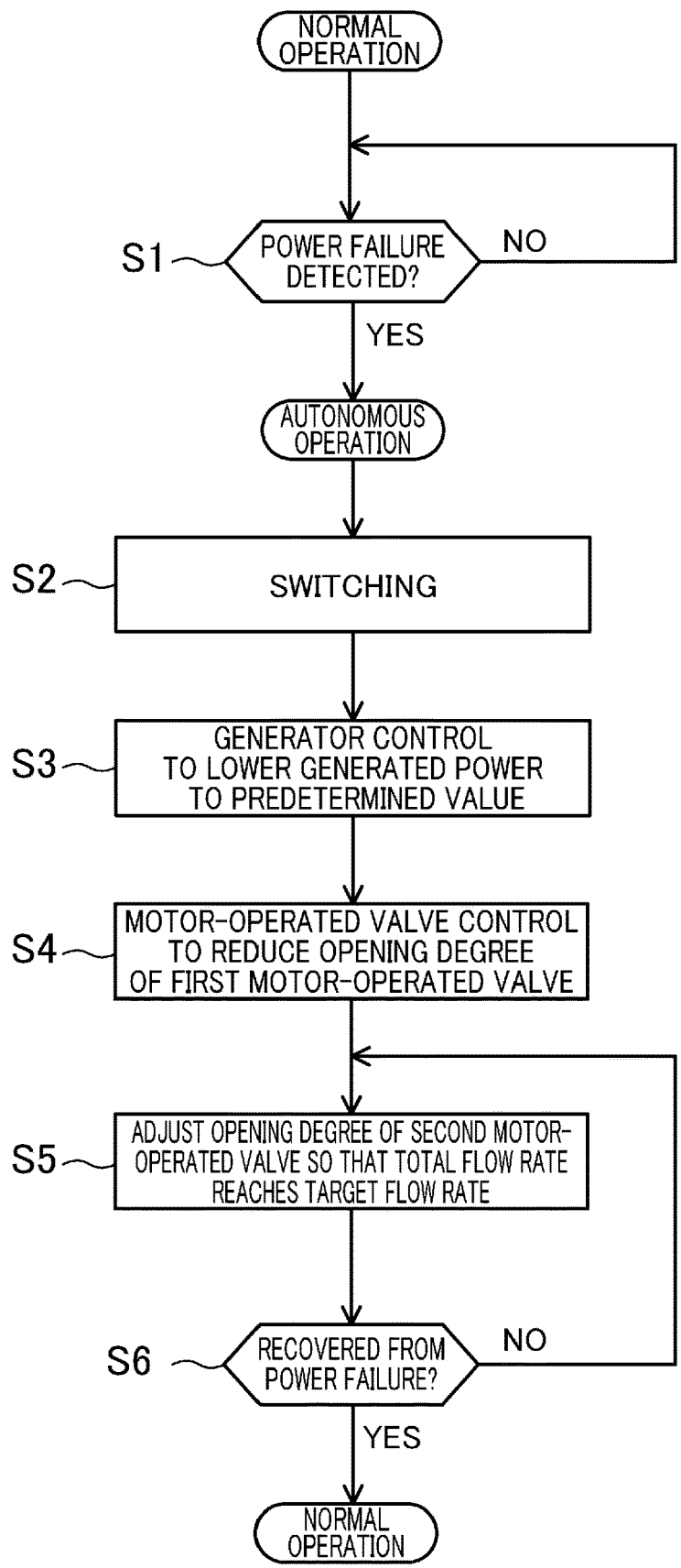
FIG. 5 is a flowchart of the autonomous operation in the hydraulic power generation system.
Figure 6:
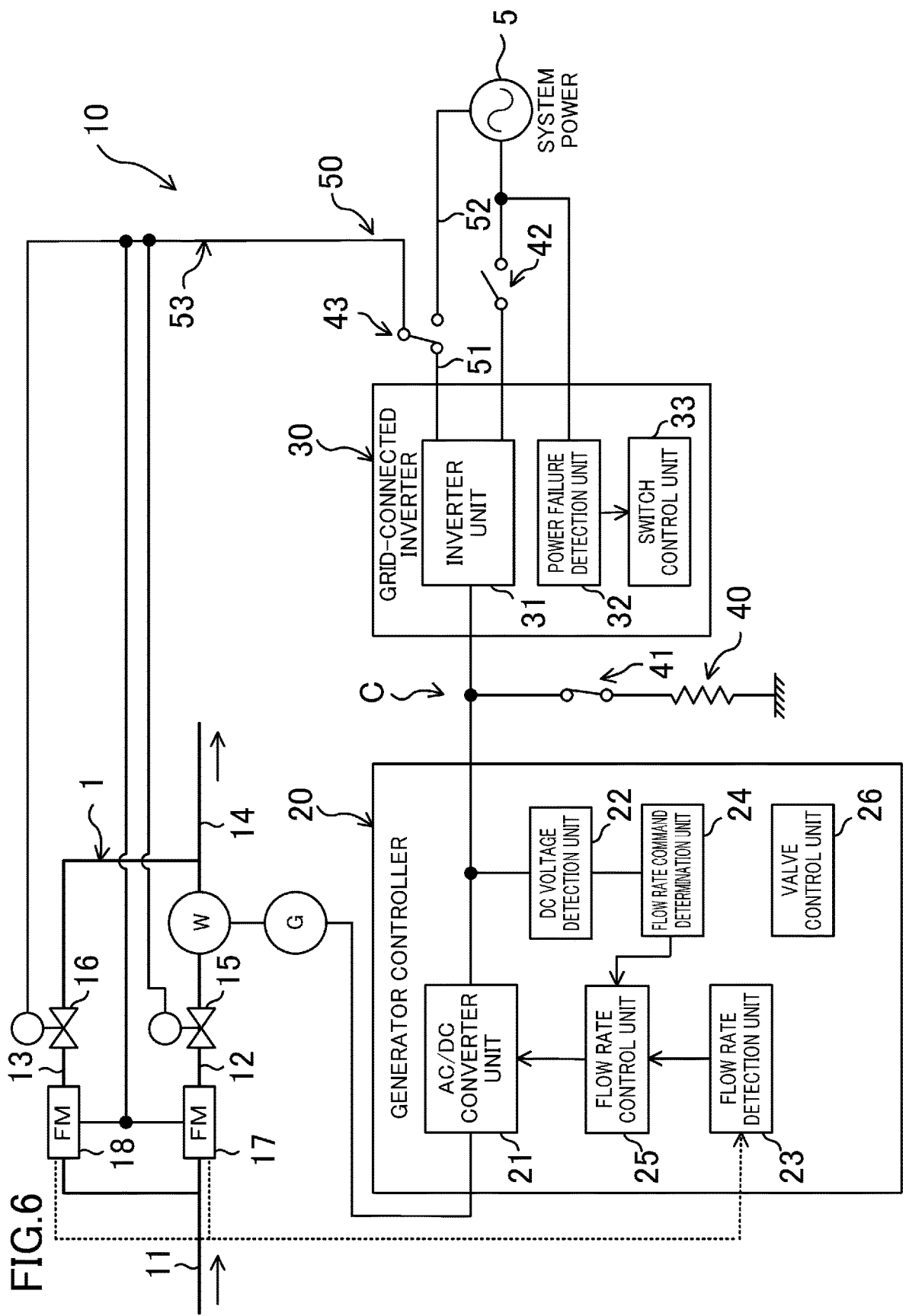
FIG. 6 is a diagram illustrating a power system of the hydraulic power generation system, and illustrates a state of the autonomous operation.

As shown in the flowchart of FIG. 5, it is assumed that the power failure detection unit (32) detects a power failure of the power system (5) in the normal operation (Step (S1)). Then, the switch control unit (33) switches the states of the first switch unit (41), the second switch unit (42), and the third switch unit (43). Specifically, the second switch unit (42) is set to the OFF state and the third switch unit (43) is set to the second state in the autonomous operation. Further, the switching of the first switch unit (41) is repeated at a predetermined duty ratio. The duty ratio varies depending on the power consumption of the electric devices (15, 16, 17, 18) provided at the penstock (1).

In this manner, the power generated by the generator (G) is supplied to the AC/DC converter unit (21), the inverter unit (31), and the auxiliary circuit (50) in the autonomous operation. The generated power supplied to each of the auxiliary circuit (50) is supplied to the first motor-operated valve (15), the second motor-operated valve (16), the first flowmeter (17), and the second flowmeter (18). At the same time, the power generated by the generator (G) is supplied to the regenerative resistor (40) as appropriate. An excessive increase in the voltage of the generator controller (20) can thus be reliably reduced.

When the autonomous operation starts, control is performed first so that the power generated by the generator (G) is forcibly reduced to a predetermined value (generator control). In the generator control, the target value of the power to be generated by the generator (G) is changed to a power value (Pc) lower than the rated output, as shown in FIG. 4.

The flow rate command determination unit (24) obtains an operating point c of the water turbine (W) for setting the power to be generated by the generator (G) to the power value (Pc) from, for example, a point of intersection of a curve R, passing the total head (Ho) and the current operating point b, and an equal power generation curve (Pc) corresponding to a target value of the generated power. The flow rate command determination unit (24) obtains a flow rate command value (Q1=Qc) corresponding to the operating point c. The curve R can be considered as a flow resistance characteristic line representing the relationship between an effective head (H) and the flow rate (Q1) of the fluid passing through the water turbine (W), in a state in which the motor-operated valve (15) is open at a predetermined opening degree (e.g., 100%) at the operating point b. This means that the control of the generator (G) such to that the operating point b is shifted to the operating point c allows the generated power to be shifted to the power value (Pc) while maintaining the opening degree of the motor-operated valve (15) at a constant level.

The flow rate control unit (25) controls the switching of the AC/DC converter unit (21) so that the flow rate (Q1) in the water turbine (W) be the flow rate command value (Qc) by means of, for example, feedback control, thereby converging the output of the generator (G) to the target power value (Pc).

Such control for reducing the output of the generator (G) is superior in responsiveness to control of the motor-operated valve described below. The output of the generator (G) can thus be quickly reduced to the target power value (Pc). That is, the output of the generator (G) can be instantaneously reduced after the power failure of the power system (5), which makes it possible to prevent a voltage rise in the power supply circuit (C) with reliability and to reduce the resistance capacity of the regenerative resistor (40).

When the output of the generator (G) has reached the target power value (Pc) through the generator control, the process proceeds to Step (S4), and the motor-operated valve control is executed. In the motor-operated valve control, the valve control unit (26) gradually reduces the opening degree of the first motor-operated valve (15). Specifically, in a condition, for example, in which the opening degree of the first motor-operated valve 15 is 100% at the operating point c, the opening degree is gradually decreased to 75%, 50%, and 30%. As a result, the effective head (H) for the water turbine (W) gradually decreases, as well, and the operating point of the water turbine (W) moves in the order of a point d, a point e, and a point f.

In the motor-operated valve control, the flow rate control unit (25) finely adjusts the flow rate (Q1) in the water turbine (W) so as to maintain the power generated by the generator (G) at the target power value (Pc). The power generated by the generator (G) can be obtained as appropriate from, for example, a value (DC voltage (Vdc)) detected by the DC voltage detection unit (22).

In this manner, the generator control and the motor-operated valve control make it possible to bring the operating point of the water turbine (W) closer to the maximum power generation curve (E) while maintaining the power generated by the generator (G) at the target power value (Pc). For example, the operating point of the water turbine (W) is far from the rated operating point (e.g., the operating point b) when the operating point of the water turbine (W) is at the point c. If the operating point of the water turbine (W) is maintained at the point c in the autonomous operation, the water turbine (W) continues to operate in an unstable region, which may lead to cavitation, for example.

On the other hand, when the effective head (H) for the water turbine (W) is lowered through the motor-operated valve control described above, the operating point of the water turbine (W) approaches the maximum power generation curve (E), so that the water turbine (W) can operate in the stable region. This configuration can reduce the possibility of the cavitation, and can improve the power generation efficiency in the autonomous operation. In view of this, in a preferred embodiment, the opening degree of the motor-operated valve (15) is reduced through the motor-operated valve control so that the final operating point of the water turbine (W) in the autonomous operation satisfies the target power value (Pc) and is located on the maximum power generation curve (E).

The power generated by the generator (G) is already at the target power value (Pc) at the start of the motor-operated valve control, which makes it possible to supply the desired generated power to the first motor-operated valve (15) with reliability. The opening degree of the first motor-operated valve (15) can thus be reduced with reliability.

In a preferred embodiment, the opening degree of the second motor-operated valve (16) is fixed at a constant opening degree in the generator control and the motor-operated valve control. The number of control parameters used in generator control and the motor-operated valve control is therefore reduced, which can simplify the control process.

On the other hand, after the completion of the generator control and the motor-operated valve control, the second motor-operated valve (16) is controlled so that the total flow rate (QT) reaches the target flow rate (QT*) in the same manner as in the normal operation (Step (S5)). At this moment, the power generated by the generator (G) is being supplied to the second motor-operated valve (16), the first flowmeter (17), and the second flowmeter (18). Thus, even when the power system (5) is in a power failure state, water at the target flow rate (QT*) can be continuously supplied to the downstream side of the penstock (1).

When the power system (5) recovers from the power failure thereafter (Step (S6)), the switch units (41, 42, 43) return to their original states, and the normal operation is resumed.

Advantages of Embodiment

As can be seen, the autonomous operation is performed in the present embodiment when the power system (5) falls into a power failure state. In the autonomous operation, the power generated by the power generator (G) is supplied to each of the electric devices (15, 16, 17, 18) provided at the penstock (1). It is thus possible to continuously operate these electric devices (15, 16, 17, 18) without using an uninterruptible power supply device (UPS), for example.

The power generated by the generator (G) is reduced to a minimum required level in the autonomous operation, which can reduce the overvoltage of the power supply circuit (C). Further, provision of the regenerative resistor (40) makes it possible to consume surplus power with reliability.

The generator control is first performed in the autonomous operation. In the generator control, the generator (G) is controlled to reduce the power to generate. Thus, the power generated by the generator (G) can be quickly reduced after the power failure of the power system (5), making it possible to reduce the resistance capacity of the regenerative resistor (40).

The motor-operated valve control for reducing the opening degree of the first motor-operated valve (15) is performed after the generator control, which allows the operating point of the water turbine (W) to be shifted from an unstable region to a stable region. Cavitation can thus be avoided, and the power generation efficiency can also be improved. The first motor-operated valve (15) can be reliably operated by the power generated by the generator (G). Further, the generator control and the motor-operated valve control in combination make it possible to quickly avoid an excessive increase in the output power of the generator (G) through the generator control, the responsiveness of which is relatively high, and to reliably avoid the cavitation through the motor-operated valve control, the responsiveness of which is relatively low.

In the autonomous operation, the electric devices (15, 16, 17, 18) can be continuously operated by the reduced power generated by the generator (G) itself. Accordingly, even in the case of a power failure of the power system (5), water at a desired flow rate can be supplied to the downstream side of the penstock (1).

Second Embodiment

Figure 7:
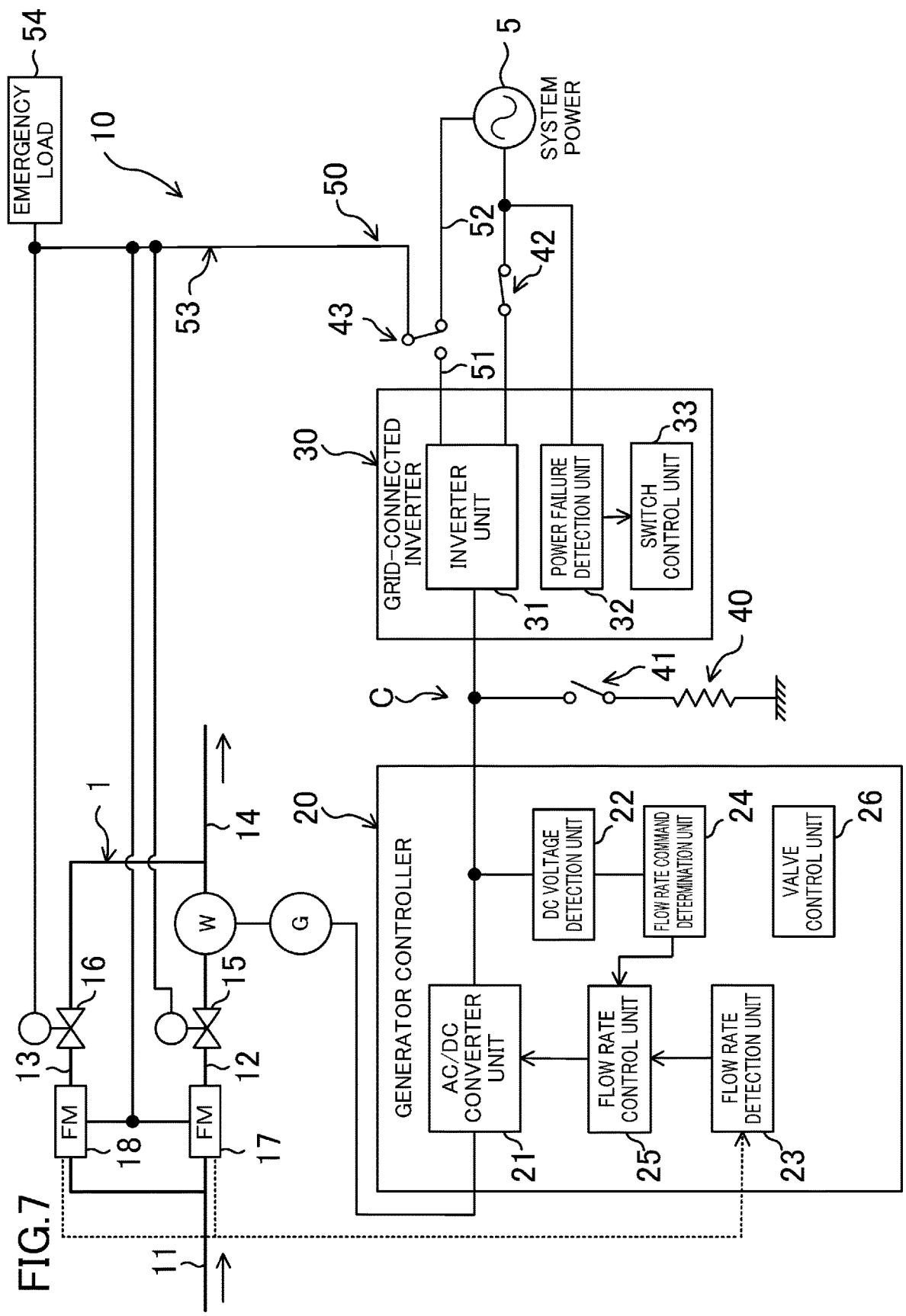
FIG. 7 is a diagram illustrating a hydraulic power generation system of a second embodiment, and corresponds to FIG. 2.

A hydraulic power generation system (10) of a second embodiment illustrated in FIG. 7 has an emergency load (54) connected to the auxiliary circuit (50) of the first embodiment. The emergency load (54) consists of, for example, an emergency light which is turned on when the power system (5) fails.

According to the second embodiment, the generated power is supplied to each of the electric devices (15, 16, 17, 18) in the same manner as in the first embodiment when the power system (5) fails. At the same time, part of the generated power is also supplied to the emergency load (54) via the auxiliary circuit (50). The emergency load (54) can thus be reliably operated without using an uninterruptible power supply (UPS) at the time of the power failure of the power system (5).

Note that the target power value (e.g., Pc) of the generator (G) in the autonomous operation according to the second embodiment is set to a value obtained by adding the power consumed by the emergency load (54) to the instantaneous total value of the power consumed by the electric devices (15, 16, 17, 18) provided at the penstock (1). Likewise, the resistance capacity of the regenerative resistor (40) corresponds to a value obtained by adding the power consumed by the emergency load (54) to the resistance capacity according to the first embodiment.

Third Embodiment

Figure 8:
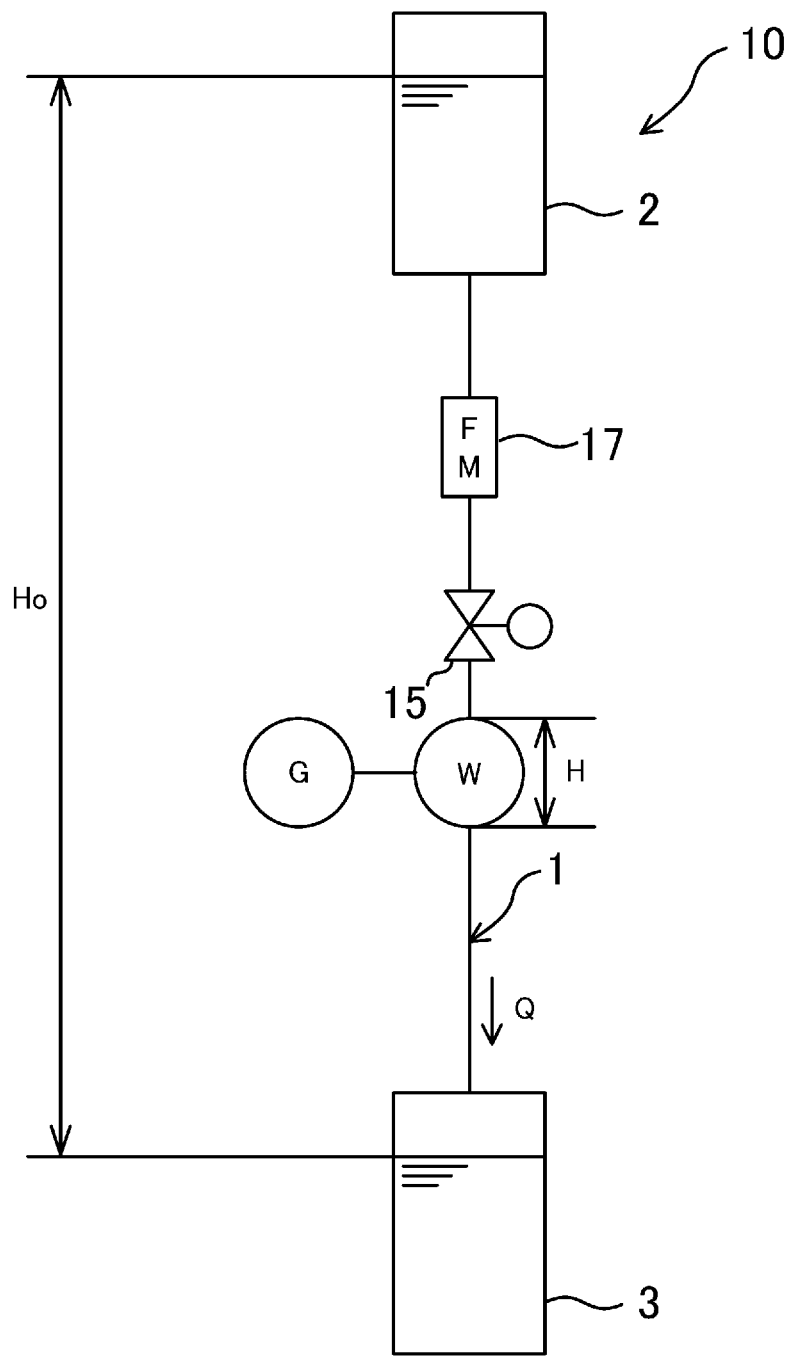
FIG. 8 is a diagram illustrating a hydraulic power generation system of a third embodiment, and corresponds to FIG. 1.

In a hydraulic power generation system (10) according to a third embodiment illustrated in FIG. 8, the penstock (1) does not include the two branch pipes (12, 13). A first flowmeter (17), a first motor-operated valve (15), and a water turbine (W) are connected in series to the single penstock (1) in the stated order from the upstream to the downstream.

In this example as well, the power generated by the generator (G) can be supplied to the first flowmeter (17) and the first motor-operated valve (15). when the power system (5) fails. This configuration allows water adjusted to a certain flow rate to be supplied to the downstream side of the penstock (1) even after the power failure of the power system (5).

Other Embodiments

The flow rate acquisition unit (17, 18) according to the above-described embodiments consists of a flowmeter. However, the flow rate acquisition unit (17, 18) may be configured to include the above-described characteristic map (M), and to estimate each flow rate according to the characteristic map (M). The hydraulic power generation system (10) may be installed not only for the penstock (1), but also for an open water channel or for a water channel in which a closed water channel (e.g., a penstock) and an open water channel are present. As an example, the hydroelectric power generation system (10) can be installed for an agricultural waterway.

The fluid supplied to the water turbine (W) is not limited to water. For example, brine which is used in an air conditioner installed in a building or any other facility may be used as the fluid.

The installation location of the hydraulic power generation system (10) is not limited to the waterworks (4).

In the above embodiments, the power generated by the generator (G) is reduced in the autonomous operation through the control of the generator (G) and the opening degree of the first motor-operated valve (15). However, the power generated by the generator (G) may be reduced in the autonomous operation only through the control of reducing the opening degree of the first motor-operated valve (15), which is an electric device, without controlling the generator (G). Alternatively, the power generated by the generator (G) may be reduced only through the control of the generator (G) without controlling the opening degree of the first motor-operated valve (15). The power generated by the generator (G) is reduced to a minimum required level in the autonomous operation, which can reduce the overvoltage of the power supply circuit (C). A regenerative resistor (40) similar to that of the above embodiments may be provided for these configurations, as well, in a preferred embodiment. In such a case, the responsiveness of the regenerative resistor (40) may be higher than that of the generator (G) and that of the first motor-operated valve (15) in a preferred embodiment.

Particularly in the case in which the opening degree of the first motor-operated valve (15) is reduced to reduce the power generated by the generator (G), there is a possibility that the response of the first motor-operated valve (15) may be delayed, resulting in an excessive to voltage rise of the generator controller (20). However, an excessive voltage rise of the generator controller (20) can be quickly reduced by the regenerative resistor (40) since the responsiveness of the regenerative resistor (40) is generally higher than that of the first motor-operated valve (15). Moreover, the capacity of the regenerative resistor (40) can also be reduced since the power generated by the generator (G) is reduced to the minimum required level through the motor-operated valve control.

INDUSTRIAL APPLICABILITY

The present invention is useful as a hydraulic power generation system.

DESCRIPTION OF REFERENCE CHARACTERS

1 Penstock (Water Channel)
5 Power System
13 Second Branch Pipe (Bypass Channel)
15 First Motor-Operated Valve
16 Second Motor-Operated Valve
17 First Flowmeter (Flow Rate Acquisition Unit)
18 Second Flowmeter (Flow Rate Acquisition Unit)
20 Generator Controller (Control Unit)
40 Regenerative Resistor (Resistor)

The invention claimed is:

1. A hydraulic power generation system, comprising:
a fluid machine connected to a water channel through which a fluid flows;
a generator driven by the fluid machine;
a power supply circuit which supplies power generated by the generator to a power system; and
a control unit which controls the power supply circuit to perform a normal operation of supplying power solely from the power system to a predetermined electric device, said predetermined electric device being provided at the water channel and disposed in the path of the flowing fluid, and an autonomous operation of supplying the power generated by the electric generator to the electric device such that the power output from the generator is maintained at a lower level than a level at which the power is outputted from the generator in the normal operation, until the control unit stops controlling the power supply circuit to perform the autonomous operation, wherein
the control unit executes the autonomous operation for a duration during which the power system fails.

2. The hydraulic power generation system of claim 1, wherein
the control unit controls the generator so that the output power of the generator decreases in the autonomous operation.

3. The hydraulic power generation system of claim 1, wherein
a motor-operated valve is connected to the water channel as the electric device, and
the control unit reduces an opening degree of the motor-operated valve in the autonomous operation so that the output power of the generator decreases.

4. The hydraulic power generation system of claim 1, wherein
a motor-operated valve is connected to the water channel as the electric device, and
the control unit controls the generator and an opening degree of the motor-operated valve so that the output power of the generator decreases in the autonomous operation.

5. The hydraulic power generation system of claim 1, wherein
a motor-operated valve is connected to the water channel as the electric device,
the hydraulic power generation system further includes a flow rate acquisition unit which acquires a flow rate of the fluid in the water channel, and the control unit controls an opening degree of the motor-operated valve in accordance with the flow rate acquired by the flow rate acquisition unit when the power system fails.

6. The hydraulic power generation system of claim 5, wherein
the water channel has a bypass channel which bypasses the fluid machine and to which the motor-operated valve is connected, and
the control unit controls an opening degree of the motor-operated valve so that a total flow rate of the fluid flowing out of the water channel approaches a target flow rate when the power system fails.

7. The hydraulic power generation system of claim 1, wherein
a resistor which consumes the power generated by the generator when the power system fails is connected to the power supply circuit.

8. The hydraulic power generation system of claim 2, wherein
a resistor, which consumes the power generated by the generator when the power system fails, is connected to the power supply circuit.

9. The hydraulic power generation system of claim 3, wherein
a resistor, which consumes the power generated by the generator when the power system fails, is connected to the power supply circuit.

10. The hydraulic power generation system of claim 4, wherein
a resistor, which consumes the power generated by the generator when the power system fails, is connected to the power supply circuit.

11. The hydraulic power generation system of claim 5, wherein
a resistor, which consumes the power generated by the generator when the power system fails, is connected to the power supply circuit.

12. The hydraulic power generation system of claim 6, wherein
a resistor which consumes the power generated by the generator when the power system fails is connected to the power supply circuit.

13. The hydraulic power generation system of claim 1, wherein the electric device is connected to the water channel upstream of the fluid machine.

* * * * *